United States Patent
Hada et al.

[11] Patent Number: 5,845,197
[45] Date of Patent: Dec. 1, 1998

[54] PORTABLE ELECTRONIC DEVICE WITH ASSOCIATED EARPHONE

[75] Inventors: Masakazu Hada; Shigehisa Wakui, both of Yamanashi-ken, Japan

[73] Assignee: Kokusai Electric Co., Ltd., Tokyo, Japan

[21] Appl. No.: 563,576

[22] Filed: Nov. 28, 1995

[30] Foreign Application Priority Data

Nov. 30, 1994 [JP] Japan ................................... 6-321463
Nov. 20, 1995 [JP] Japan ................................... 7-325061

[51] Int. Cl.⁶ ........................................................ H04B 1/38
[52] U.S. Cl. ............................ 455/90; 455/89; 379/430; 379/433; 381/183
[58] Field of Search ....................... 455/89, 90; 379/430, 379/431, 433, 428; 381/68.5, 68.6, 68.7, 69, 183, 187, 122

[56] References Cited

U.S. PATENT DOCUMENTS

| | | | |
|---|---|---|---|
| 3,521,332 | 7/1970 | Kramer | 24/81 |
| 3,747,166 | 7/1973 | Eross | 24/81 |
| 4,683,587 | 7/1987 | Silverman | 381/25 |
| 4,691,383 | 9/1987 | DeMars | 455/351 |
| 5,201,003 | 4/1993 | Pavel | 381/25 |
| 5,349,575 | 9/1994 | Park | 369/1 |
| 5,511,120 | 4/1996 | Hirata et al. | 379/433 |

FOREIGN PATENT DOCUMENTS

| | | |
|---|---|---|
| 0 355 309 | 2/1990 | European Pat. Off. . |
| 5-111088 | 4/1993 | Japan . |
| 7-58458 | 3/1995 | Japan . |

*Primary Examiner*—Reinhard J. Eisenzopf
*Assistant Examiner*—Darnell R. Armstrong
*Attorney, Agent, or Firm*—Armstrong, Westerman, Hattori, McLeland & Naughton

[57] ABSTRACT

A portable transceiver includes a transceiver body including a microphone, and an earphone including an earphone body physically separated from the transceiver body when in use, and a cord. The cord has one end connected to the transceiver body and the other end connected to the earphone body. A communication cable extends between the transceiver body and a portable wireless means. A holder is releasably secured to the communication cable so as to hold the earphone body in position. The earphone is thus integral with the transceiver body when not in use and can be carried with the transceiver without the need to store the earphone in a user's pocket. This allows the user to have ready access to the earphone whenever necessary.

12 Claims, 6 Drawing Sheets

PORTABLE ELECTRONIC DEVICE WITH ASSOCIATED EARPHONE

BACKGROUND OF THE INVENTION

1. Field of the Invention

The present invention relates to a portable electronic device with an associated earphone and more particularly, to a portable electronic device which allows for ready storage of an earphone when not in use.

2. Description of the Related Art

Portable electronic devices with associated earphones typically include a portable transceiver, a portable radio, and a portable sound reproducing unit such as a tape recorder and a compact disk player. For example, the portable transceiver is used to effect intercommunication between security guards or body guards.

Referring to FIG. 12, a known portable transceiver generally includes a wireless unit 1, a transceiver body 2, a microphone 3 and an earphone 4, as disclosed in Japanese laid-open patent publication No. Hei 7-58458. The wireless unit 1 is contained within a casing and attached to a belt 5 of a security or body guard. A communication cable 1a provides a connection between the wireless unit 1 and the transceiver body 2. The transceiver body 2 is secured to the upper part of a guard's cloth. The microphone 3 is connected to the transceiver body 2. A cord 6 has one end connected to the earphone 4 and the other end connected to a plug (not shown) inserted into an earphone jack (not shown) which is provided in the transceiver body 2.

When the earphone 4 is not in use, the plug of the earphone 4 is disconnected from the earphone jack and stored typically in a cloth pocket 7. It is thus inconvenient and cumbersome to handle the earphone. This creates a problem particularly when urgent intercommunication is required and even results in loss of the earphone 4.

Earphones associated with other portable electronic devices such as a portable radio or cassette tape player are also difficult to handle when not used.

Japanese laid-open patent publication No. Hei 5-111088 discloses a portable cassette tape player wherein a control unit is connected to a cord between an earphone body and a plug and adapted to control volume or other functions. The control unit has a pair of projections and a plug pocket. The projections serve to secure the earphone body in position and the plug of the earphone is stored in the pocket, thereby the earphone can be handled with the earphone body and the plug stored when not used.

However, the earphone is secured to the control unit rather than the body of the portable cassette tape player. That is, the earphone body is connected to the portable cassette tape player through the cord, but physically separated from the body of the cassette tape player. Accordingly, when the earphone is not used, it needs to be stored in a suitable place such as the pocket of a user's cloth after the plug is disconnected from the jack of the cassette tape player. This increases the likelihood of loss of the earphone. Also, the earphone is not readily accessible and it is inconvenient and cumbersome for the user to handle or take the earphone out of the storage place. This creates a problem particularly in the event of emergency.

SUMMARY OF THE INVENTION

In view of the foregoing, it is an object of the present invention to provide a portable electronic device which enables ready handling of and prevents loss of an associated earphone, and which allows a user to have ready access to the earphone when it is necessary for the user to intercommunicate with other users, particular in case of emergency.

In order to achieve this object, the present invention, as one aspect, provides a portable electronic device comprising a transceiver body adapted to be secured to a user and including a microphone, a communication cable having one end connected to the transceiver body, an earphone including an earphone body and a cord having one end connected to the transceiver body and the other end connected to the earphone body, and a holder attached to the communication cable for holding the earphone body in position.

According to another aspect of the present invention, there is provided a portable electronic device comprising a transceiver body adapted to be secured to a user including a microphone, a communication cable connected to the transceiver body, an earphone including an earphone body and a cord having one end connected to the transceiver body and the other end connected to the earphone body, and holder means connected to the earphone and securable to the communication cable.

According to a further aspect of the present invention, there is provided a portable electronic device comprising a device body, an earphone including an earphone body and a cord having one end connected to the device body and the other end connected to the earphone body, and holder means connected to the earphone and adapted to be secured to the device body.

According to still another aspect of the present invention, there is provided a portable electronic device comprising a device body, an earphone including an earphone body and a cord having one end connected to the device body and the other end connected to the earphone body, and holder means provided in the device body and adapted to hold the earphone body in position.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
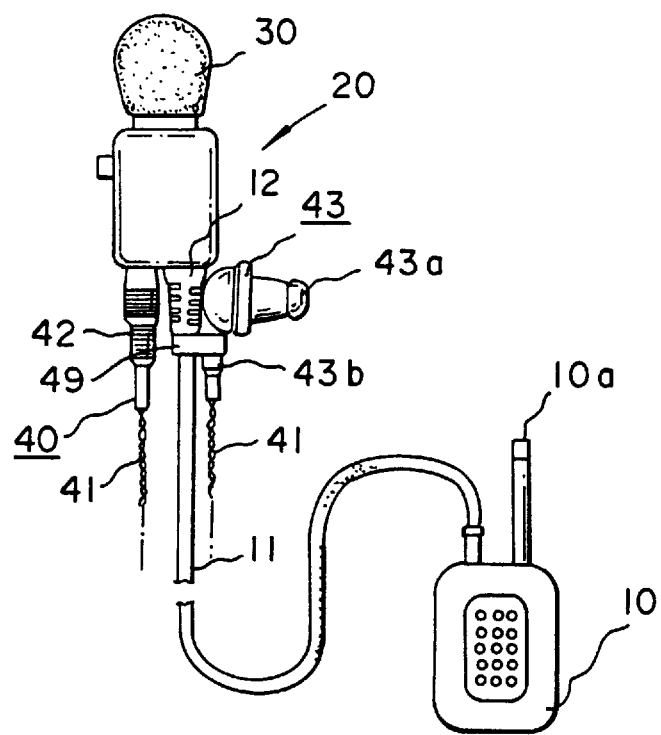
FIG. 1 is a front view showing the principal part of a portable transceiver according to a first embodiment of the present invention.
Figure 2:
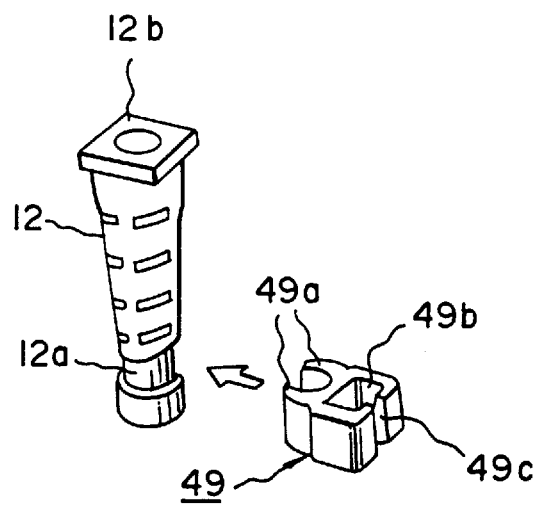
FIG. 2 is an exploded perspective view showing the manner in which an earphone holder is attached to a protective sleeve.
Figure 3:
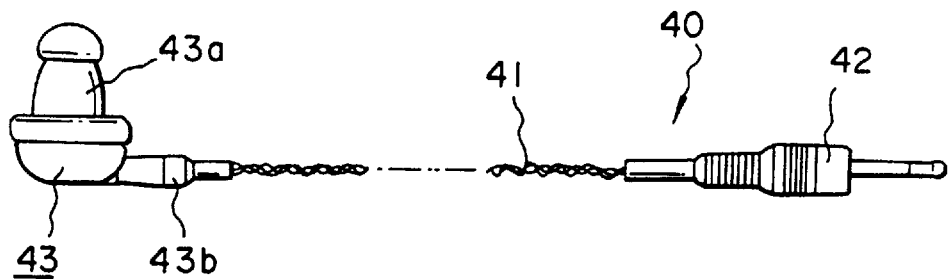
FIG. 3 is a side view of an earphone for use with the portable transceiver shown in FIG. 1.
Figure 4:
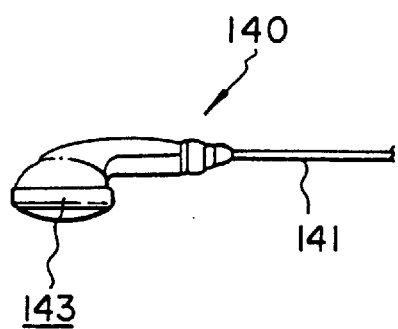
FIG. 4 is a partial view of a modified form of the earphone shown in FIG. 3.

FIGS. 1 to 4 show a portable transceiver made according to a first embodiment of the present invention. FIG. 1 is a front view of the portable transceiver. FIG. 2 is an exploded perspective view of the principal part of the portable transceiver. FIG. 3 is a side view of an earphone. FIG. 4 is a modified form of the earphone.

Figure 12:
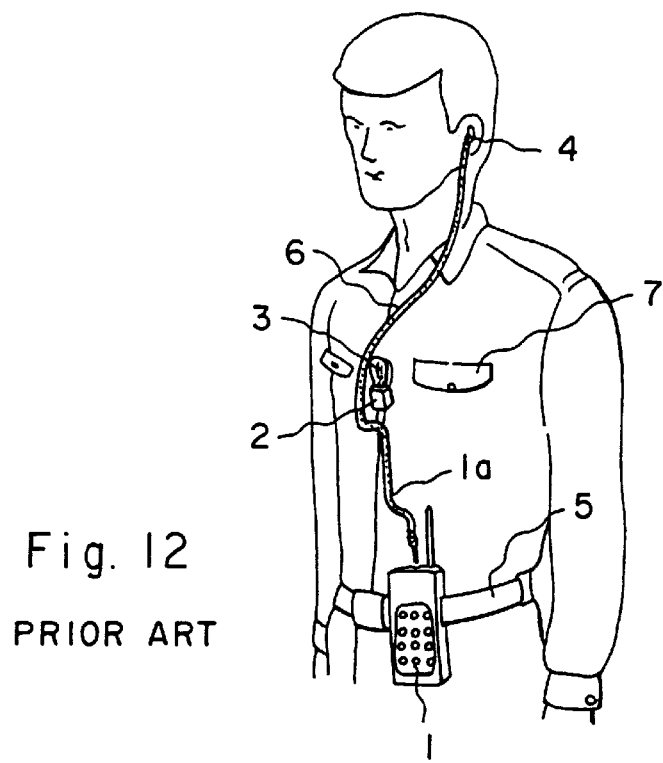
FIG. 12 illustrates a conventional portable transceiver in use.

Referring first to FIG. 1, the portable transceiver includes a transceiver body 20 adapted to be secured to a user's cloth by any suitable securing means such as a clip. Similar method to clip the transceiver body to a user's cloth is employed in the conventional device shown in FIG. 12. A microphone 30 is mounted to the top of the transceiver body 20. A communication cable 11 has one end connected to the bottom of the transceiver body 20 and the other end connected to a wireless means 10. The wireless means 10 includes an antenna 10a. The transceiver body 20 has an earphone jack (not shown) adjacent to the one end of the communication cable 11. An earphone 40 has a plug 42 which is connected to the earphone jack. A protective sleeve 12 is fit around one end of the communication cable 11 to provide relief against potential strain. The communication cable 11 is connected to the transceiver body 20 through the protective sleeve 12.

As shown in FIG. 3, the earphone 40 has a known structure and generally includes a cord 41, the plug 42 connected to one end of the cord 41, and an earphone body 43 connected to the other end of the cord 41. As is known, the earphone body 43 has an insert 43a adapted to be fit in a user's ear, and a sleeve 43b having one end unitarily formed with the insert 43a. The other end of the sleeve 43b is connected to the cord 41.

The earphone 40 is not limited to the specific form shown in FIG. 3 and may take other forms. FIG. 4, for example, shows an earphone 140 in a modified form. Numerals denoting elements in FIG. 4 which elements correspond to similar elements in FIG. 3 are prefixed with 1.

Referring now to FIG. 2, the protective sleeve 12 is made of a resilient material such as rubber or plastic and has a frustconical shape. The sleeve 12 is in the form of a hollow tube and shaped to receive the communication cable 11. The sleeve 12 has an upper (large diameter) end detachably connected to the bottom of the transceiver body 20 through an opening (not shown). An annular recess or groove 12a is formed in the lower (small diameter) end of the sleeve 12. An earphone holder 49 is detachably connected to the annular recess 12a. An end flange or retainer 12b is connected to the upper end of the sleeve 12 so as to prevent the sleeve 12 from being disconnected from the transceiver body 20. A structure for mounting the sleeve 12 is well known in the art and will not be described herein.

As shown in FIG. 2, the earphone holder 49 is made of a resilient material such as rubber and plastic, but is more rigid than the sleeve 12. A pair of pawls 49a, 49a extend from one side of the earphone holder 49. The earphone holder 49 has a holder opening 49b defined adjacent to the pawls 49a, 49a, and a vertical slit 49c defined in the other side of the earphone holder 49 and communicated with the holder opening 49b.

The earphone holder 49 can be detachably mounted to the sleeve 12 by fitting the pawls 49a, 49a around the annular recess 12a, with the sleeve 43b of the earphone body 43 held in position in the holder opening 49b (see FIG. 1).

In use, the wireless means 10 is attached to a user's belt while the transceiver body 20 is secured to the upper portion of a user's cloth, as in the prior art. To effect intercommunication between the users, the plug 42 of the earphone 40 is inserted into the earphone jack of the transceiver body 20. The earphone body 43 is then fit in a user's ear (see FIG. 12).

When not in use, the sleeve 43b of the earphone body 43 is inserted through the holder opening 49b of the earphone holder 49 which is, in turn, connected to the transceiver body 20. This results in the earphone body 43 being integral with the transceiver body 20. Since the earphone holder 49 has a certain degree of rigidity such that the earphone body 43 can be firmly held in place.

By this arrangement, the earphone 40 can be carried integrally with the transceiver body 20 without the need to disconnect the plug 42 from the earphone jack and store the plug 42 in the pocket as in the prior art. This significantly reduces the chance of loss of the earphone 40. Also, the earphone 40 is immediately useable when in need of intercommunication since the plug 42 is kept inserted into the earphone jack of the transceiver body 20. This is a substantial advantage over the prior art portable transceiver, particularly in case of emergency.

The slit 49c of the earphone holder 49 allows the cord 41 to be readily inserted into and removed from the holder opening 49b during mounting and dismounting of the earphone body 43. Also, the slit 49c, with the aid of resiliency of the earphone holder 49, permits a change in the shape or size of the earphone holder 49b and thus, enables ready insertion and removal of the sleeve 43b of the earphone body 43 into and from the earphone opening 49b.

The protective sleeve 12 is more flexible than the earphone holder 49 and is plastically deformed to thereby cause removal of the earphone holder 49 if undue external force is exerted on the earphone 40, for example, when the cord 41 is caught on an object, while the earphone body 43 is secured in place in the earphone holder 49. This reduces the chance of damage to the earphone 40. Even if a greater degree of force is exerted to cause damage to the earphone 40, the transceiver 20 and its related components are free from damage since the earphone holder 49 is disconnected from the sleeve 12. This is a substantial advantage over the prior art portable transceiver since the sleeve 12 and the communication cable 11 are not easily replaceable and more expensive than the earphone 40.

Figure 5:
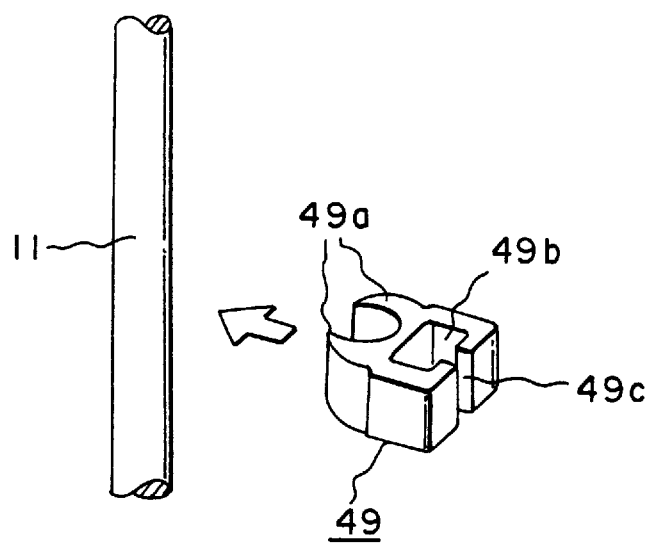
FIG. 5 is an exploded perspective view showing the principal part of a portable transceiver according to a second embodiment of the present invention.

FIG. 5 is an exploded perspective view showing the principal part of a portable transceiver made according to a second embodiment of the present invention. Like parts are given like reference numerals.

In this embodiment, the earphone holder 49 is releasably attached to the communication cable 11 rather than the protective sleeve 12. The earphone holder 49 is made of a resilient material such as rubber or plastic and more rigid than a tubular jacket which extends around the cable core and is made, for example, of resin. The two pawls 49a, 49a cooperate to grip the communication cable 11 to provide an attachment of the earphone holder 49 to the transceiver body 20. The sleeve 43b of the earphone body 43 is releasably secured in place in the holder opening 49b.

As in the first embodiment, the earphone body 43 can be carried as an integral unit with the transceiver body 20, with the sleeve 43b of the earphone body 43 being secured in place in the holder opening 49b of the earphone holder 49, after the earphone body 43 has been removed from the user's ear. This arrangement substantially reduces the chance of loss of the earphone 40 even when not in use. Also, the user has ready access to the earphone 40 when in need of intercommunication since the plug 42 is constantly inserted into the earphone jack of the transceiver body 20.

The communication cable 11 is more flexible than the earphone holder 49 and is plastically deformed to thereby cause removal of the earphone holder 49 if undue external force is exerted on the earphone 40, for example, when the cord 41 is caught on an object, while the earphone body 43 is secured in place in the earphone holder 49. This reduces the chance of damage to the earphone 40. Even if a greater degree of force is exerted to cause damage to the earphone 40, the transceiver 20 and its related components are free from damage since the earphone holder 49 is disconnected from the sleeve 12. This is a substantial advantage over the prior art portable transceiver since the communication cable 11 is not easily replaceable and more expensive than the earphone 40.

Figure 6:
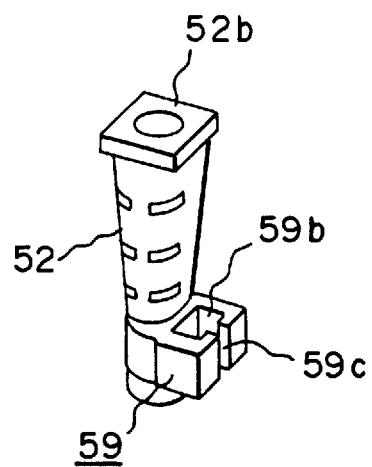
FIG. 6 is a perspective view showing the principal part of a portable transceiver according to a third embodiment of the present invention.

FIG. 6 is a perspective view showing the principal part of a portable transceiver made according to a third embodiment of the present invention. The other parts of the portable transceiver are substantially identical to those of the previous embodiment shown in FIGS. 1 to 3 and will not be described herein.

In this embodiment, an earphone holder 59 and a sleeve 52 of the communication cable 11 are formed in one piece. The earphone holder 59 has a holder opening 59b sized to receive the earphone holder 43, and a vertical slit 59c communicated with the holder opening 59b. The sleeve 52 has an end flange 52b and is made of a resilient material identical to that of the earphone holder 59.

As in the first embodiment, the earphone body 43 can be carried as an integral unit with the transceiver body 20, with the sleeve 43b of the earphone body 43 being secured in place in the holder opening 59b of the earphone holder 59, after the earphone body 43 has been removed from the user's ear. This substantially reduces the chance of loss of the earphone 40. Also, the user has ready access to the earphone 40 when in need of intercommunication since the plug 42 is kept inserted into the earphone jack of the transceiver body 20.

If undue external force is exerted on the earphone 40, for example, when the cord 41 is caught on an object, while the earphone body 43 is secured in place in the holder opening 59, the slit 59c promotes enlargement of the holder opening 59c to thereby cause removal of the earphone body 43 from the earphone holder 59. This substantially reduces the likelihood of damage to the earphone 40.

Figure 7:
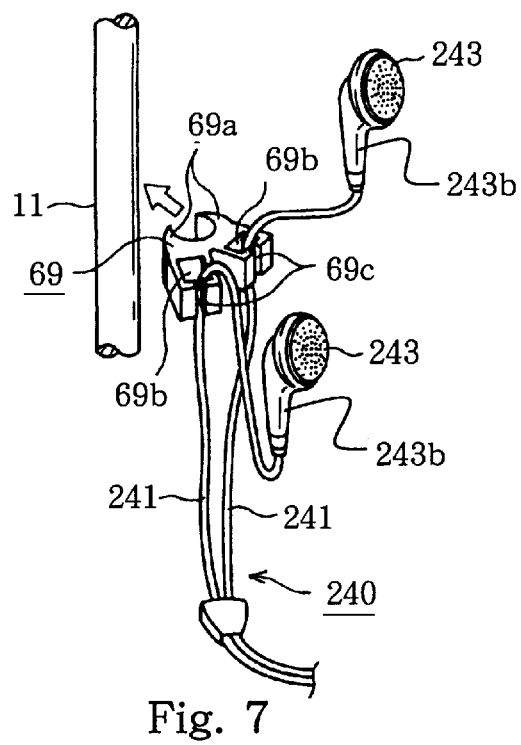
FIG. 7 is an exploded perspective view showing the principal part of a portable transceiver according to a fourth embodiment of the present invention.

FIG. 7 is an exploded perspective view showing the principal part of a portable transceiver made according to a fourth embodiment of the present invention. Numerals denoting earphone parts in FIG. 8 which elements correspond to similar earphone parts in FIGS. 1 to 3 are prefixed with 2.

In this embodiment, an earphone 240 includes a pair of earphone bodies 243, 243 adapted to be fit in user's ears and a corresponding pair of cords 241, 241 connected to the earphone bodies 243, 243. An earphone holder 69 includes a pair of pawls 69a, 69a, a pair of holder openings 69b, 69b, and a pair of slits 69c, 69c communicated with the holder openings 69b, 69b. The earphone holder 69 is made of a resilient material such as rubber or plastic which is more rigid than that of the tubular jacket of the communication cable 11. The pawls 69a, 69a of the earphone holder 69 cooperate to grip the communication cable 11 such that the earphone holder 69 can be releasably attached to the communication cable 11 or the body of the transceiver. The earphone bodies 243, 243 have respective sleeves 243b, 243b which are secured in place in the corresponding holder openings 69b, 69b. The slits 69c, 69c allow for enlargement of the holder openings 69b, 69b when the sleeves 243b, 243b are inserted therethrough.

As in the first embodiment, the earphone bodies 243, 243 can be carried as an integral unit with the transceiver body 20 with the sleeves 243b, 243b of the earphone bodies 243, 243 being secured in place in the holder openings 69b, 69b of the earphone holders 69, 69 after the earphone bodies 243, 243 have been removed from the user's ears.

The communication cable 11 is subject to plastic deformation when undue external force is applied to the earphone 240 while the earphone bodies 243, 243 are held in the earphone holder 69. As this occurs, the earphone holder 69 is disconnected from the communication cable 11. Thus, the earphone 240 and the communication cable 11 are both free from damage.

Figure 8:
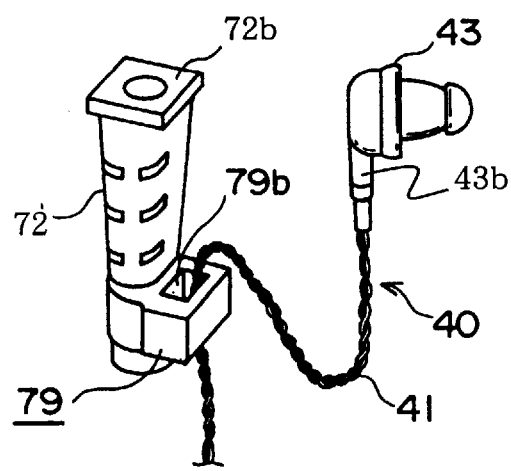
FIG. 8 is a perspective view showing the principal part of a portable transceiver according to a fifth embodiment of the present invention.

FIG. 8 is a perspective view showing the principal part of a portable transceiver made according to a fifth embodiment of the present invention. Like parts are given like reference numerals used in FIGS. 1 to 3.

In this embodiment, an earphone holder 79 is integral with a protective sleeve 72 of the communication cable. The earphone holder 79 and the protective sleeve 72 are made of the same resilient material. The earphone holder 79 has a holder opening 79b adapted to receive the earphone body 43. As opposed to the previous embodiments, the earphone holder 79 has no slit.

As in the first embodiment, the earphone body 43 can advantageously be carried as an integral unit with the transceiver body 20, with the sleeve 43b of the earphone body 43 being received in the holder opening 79b of the earphone holder 79 connected to the sleeve 72 of the communication cable, after the earphone body 43 has been removed from the user's ear. Although no slit is formed in the earphone holder 79, the resiliency of the earphone holder 79 per se allows for enlargement and deformation of the holder opening 79b. As such, the sleeve 43b can readily be inserted into and removed from the holder opening 79b.

This arrangement substantially reduces the chance of loss of the earphone 40 even when not in use. Also, the user has ready access to the earphone 40 when in need of intercommunication since the earphone plug 42 is kept inserted into the earphone jack of the transceiver body 20.

Figure 9:
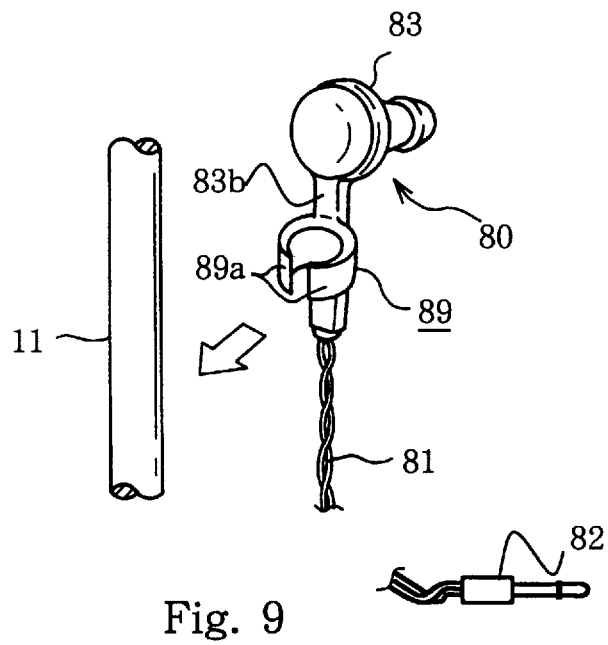
FIG. 9 is an exploded perspective view showing sixth embodiment of the present invention.

FIG. 9 is an exploded perspective view showing the principal part of a portable transceiver according to a sixth embodiment of the present invention. Like elements are given like reference numerals used in FIGS. 1 to 3.

In this embodiment, an earphone holder 89 is integral with an earphone body 83. The earphone holder 89 is connected to the rear surface of a sleeve 83b and adapted to releasably secure the earphone body 83 to the communication cable 11. Preferably, the earphone holder 89 and the earphone body 83 are integrally molded of a resilient material which is more rigid than the material of the tubular jacket of the communication cable 11. The earphone holder 89 includes a pair of pawls 89a, 89a designed to grip the communication cable 11. In this way, the earphone body 83 can be detachably connected to the transceiver body 20.

As in the foregoing embodiment, the earphone body 83 can be carried as an integral unit with the transceiver body 20, with the pawls 89a, 89a of the earphone body 83 gripping the communication cable 11, after the earphone body 83 has been removed from the user's ear. This substantially reduces the chance of loss of an earphone 80 even when not in use. Also, the earphone 80 can immediately be used when in need of intercommunication since a plug 82 is kept connected to the earphone jack of the transceiver body 20.

If undue external force is applied to the earphone 80 while the earphone body 83 is secured to the communication cable 11 through the earphone holder 89, the earphone holder 89 will be disconnected from the communication cable 11 so as to prevent damage to the earphone 80 and the communication cable 11.

The present invention is illustratively applied to a portable transceiver, but may, of course, be applied to a wide variety of electronic devices with associated earphones, as will be described in the following paragraphs.

Figure 10:
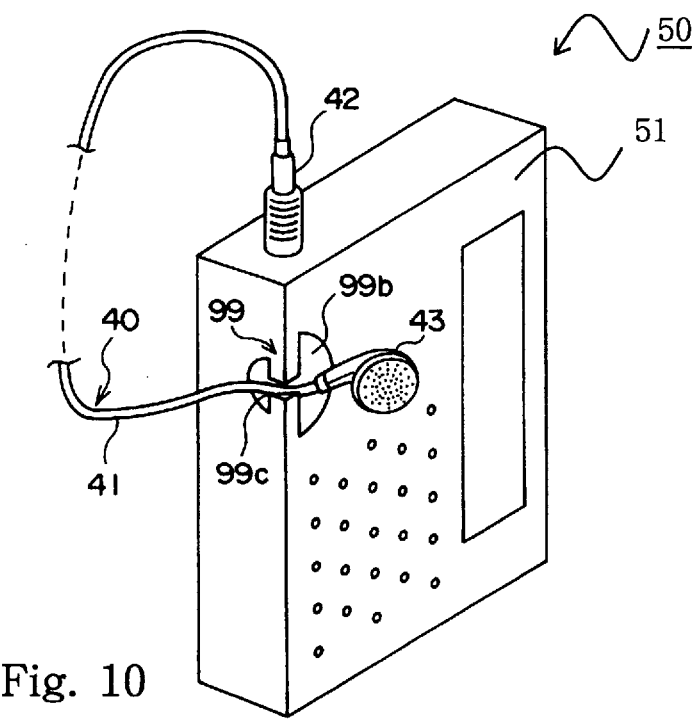
FIG. 10 is a perspective view of a portable radio according to a seventh embodiment of the present invention.

FIG. 10 is a perspective view of a portable radio according to a seventh embodiment of the present invention. Like parts are given like reference numerals used in FIGS. 1 to 3.

In this embodiment, a portable radio 50 has a casing 51 made, for example, of plastic. An earphone holder 99 is formed in the casing 51 so as to secure the earphone body 43 in place. A through holder opening 99b extends obliquely from one side wall to the adjacent side wall of the casing 51 as shown in FIG. 10. A slit 99c is formed in the edge of the casing 51 and communicated with the holder opening 99b.

As in the previous embodiments, the earphone body 43 can be carried as an integral unit with the portable radio 50, with the earphone body 43 being secured within the holder opening 99b, after the earphone body 43 has been removed from the user's ear. Due to the presence of the slit 99c, the holder opening 99b is subject to enlargement and deformation and the cord 41 can readily be inserted through the holder opening 99b. Thus, the earphone body 43 can readily be inserted into and removed from the holder opening 99b.

This arrangement substantially reduces the chance of loss of the earphone 40 even when not in use. The user has ready access to the earphone 40 whenever necessary since the plug 42 is constantly connected to the radio 50.

Figure 11:
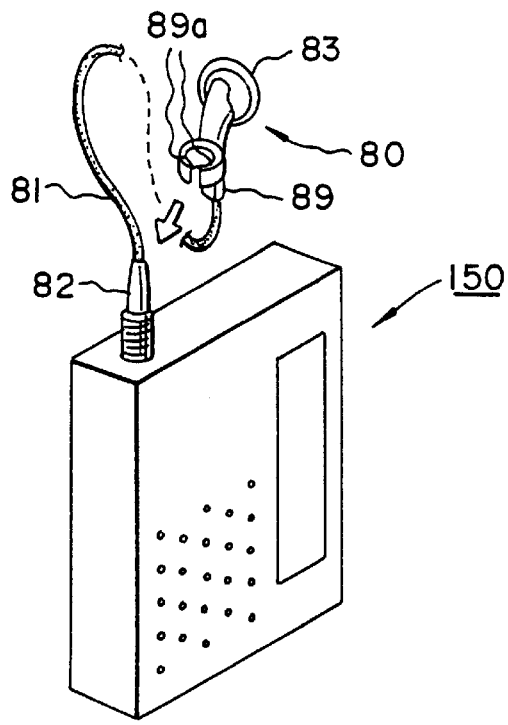
FIG. 11 is a perspective view of a portable radio according to an eighth embodiment of the present invention.

FIG. 11 is a perspective view of a portable radio according to an eighth embodiment of the present invention. Illustratively, a portable radio 150 employs the earphone used in the sixth embodiment. Like earphone parts are given like reference numerals used in FIG. 9. The earphone holder 89 are unitarily formed with the rear side of the earphone body 83. The two pawls 89a, 89a of the earphone holder 89 grip the plug 82 which in turn, is connected to the earphone jack (not shown) of the portable radio 150. In this way, the earphone body 83 can be releasably secured to the body of the radio 150.

As in the previous embodiment, the earphone body 83 can be carried as an integral unit with the radio 150, with the two pawls 89a, 89a of the earphone body 83 gripping the plug 82, after the earphone body 83 has been removed from the user's ear. This arrangement substantially reduces the chance of loss of the earphone 80 even when not in use. Also, the earphone can immediately be used since the plug 82 is constantly connected to the radio 150.

It should be appreciated that the principal object of the present invention is to integrally attach the earphone body to the body of a portable electronic device when the earphone is not used. Although the present invention has been described with respect to its preferred embodiments, it is to be understood that various modifications and changes may be made without departing from the object and the scope of the invention as defined in the appended claims.

What is claimed is:

1. A portable electronic device comprising:
   a transceiver body adapted to be secured to a user, said transceiver body including a microphone;
   a communication cable having one end connected to the transceiver body;
   an earphone comprising an earphone body and a cord having one end connected to the transceiver body and the other end connected to the earphone body; and
   a holder attached to the communication cable for holding the earphone body in position.

2. A portable electronic device according to claim 1, further comprising portable wireless means connected to the other end of said communication cable, said portable wireless means including an antenna.

3. A portable electronic device according to claim 1, wherein the communication cable includes a protective sleeve around the one end of the communication cable connected to the transceiver body, and the holder is attached to the protective sleeve.

4. A portable electronic device according to claim 3, wherein the holder and the protective sleeve are integrally molded together.

5. A portable electronic device according to claim 3, wherein the protective sleeve has a recess, the holder includes a pair of pawls, and the pawls are fit within the recess such that the holder is releasably secured to the protective sleeve.

6. A portable electronic device according to claim 1, wherein the holder includes a pair of pawls, and the pawls are fit around the communication cable such that the holder is releasably secured to the communication cable.

7. A portable electronic device according to claim 1, wherein the holder includes a pair of holding pawls for holding the earphone body in position.

8. A portable electronic device according to claim 1, wherein the holder includes a holder opening through which the cord passes, said holder opening has a diameter less than that of the earphone body, and said earphone body is held at one open end of the holder.

9. A portable electronic device according to claim 1, wherein the communication cable includes a tubular protective jacket made of a resilient material, and the holder is made of a resilient material which is more rigid than that of the protective jacket.

10. A portable electronic device comprising:
    a transceiver body adapted to be secured to a user, the transceiver body including a microphone;
    a communication cable connected to the transceiver body;
    an earphone including an earphone body and a cord having one end connected to the transceiver body and the other end connected to the earphone body; and
    holder means connected to the earphone and adapted to be secured to the communication cable.

11. A portable electronic device comprising:
    a device body;
    an earphone including an earphone body and a cord having one end connected to the device body and the other end connected to the earphone body; and
    holder means connected to the earphone and adapted to be secured to the device body.

12. A portable electronic device comprising:
    a device body;
    an earphone including an earphone body and a cord having one end connected to the device body and the other end connected to the earphone body; and
    holder means provided in the device body and adapted to hold the earphone body in position.

* * * * *